Jan. 30, 1951     L. W. WIGHTMAN     2,539,879
MECHANISM FOR ADJUSTING SHAFT END PLAY
Filed May 13, 1949
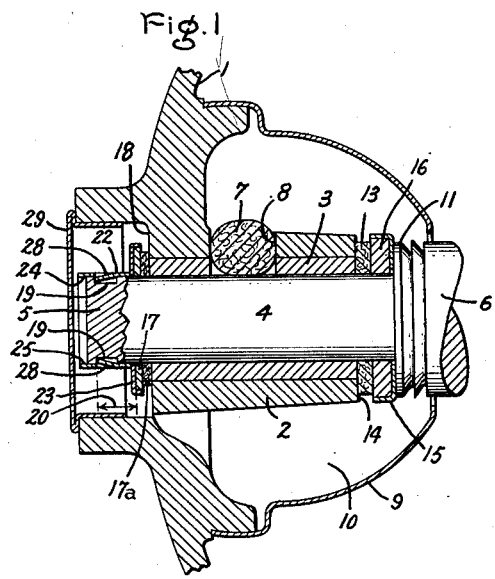
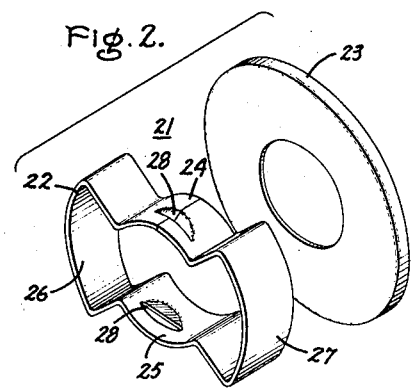
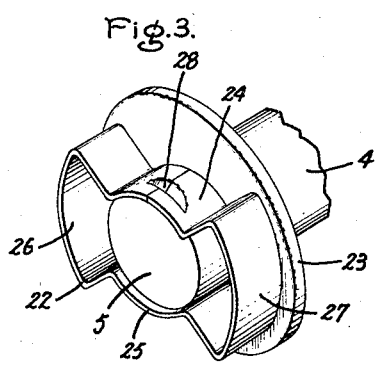
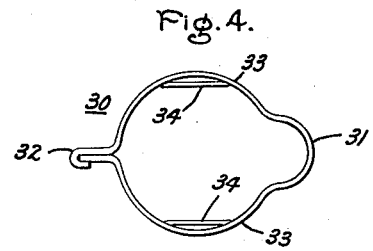
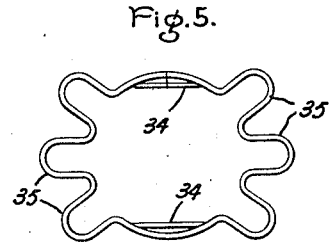
Inventor:
Lawrance W. Wightman,
by Prowell & Mack
His Attorney.

Patented Jan. 30, 1951

2,539,879

UNITED STATES PATENT OFFICE 2,539,879

MECHANISM FOR ADJUSTING SHAFT END PLAY

Lawrance W. Wightman, Fort Wayne, Ind., assignor to General Electric Company, a corporation of New York Application May 13, 1949, Serial No. 93,093

3 Claims. (Cl. 308—161)

This invention relates to apparatus having rotatable shafts and more specifically to a mechanism for adjusting axial end play of rotatable shafts.

As described in my copending application Serial No. 50,945, filed September 24, 1948, now Patent No. 2,471,180, issued May 24, 1949, and assigned to the assignee of the present application, in the manufacture of rotating equipment having two bearings, such as dynamoelectric machines, it has been customary to limit the axial end play of the shaft by holding it in place between the bearings by the use of shaft shoulders with combinations of shim washers of various thicknesses. This involves a complicated trial and error assembly program to select the proper shim washers and, since the tolerances accumulate between the bearings, it is still difficult to hold the axial end play of the shaft within desirable limits. In the case of dynamoelectric machines having a centrifugal switch actuating mechanisms mounted on the shaft, excessive axial end play increases the required switch setting and causes difficulty in securing a centrifugal mechanism which will actuate the switch at the proper speeds. It is, therefore, desirable to provide a simple means for adjusting the axial end play of a shaft and for holding the end play within narrow limits.

It is an object of this invention to provide an improved arrangement for limiting axial end play of a rotatable shaft.

Another object of this invention is to provide an improved arrangement for adjusting the axial end play of a rotatable shaft and for holding the end play within desired limits.

Another object is to provide such an arrangement as may be used repeatedly in reassembly of a machine to provide adjustment of the axial end play of a rotatable shaft.

Further objects and advantages of this invention will be better understood from the following description referring to the accompany drawing. The features of novelty which characterize the invention will be pointed out with particularity in the claims annexed to and forming a part of this specification.

In one aspect of this invention, a rotatable shaft is held in place by locking it around one bearing instead of holding it between two bearings. A shoulder is provided on the shaft on one side of the bearing and oppositely disposed grooves are formed in the periphery of the shaft at the other end of the same bearing. The only variable dimension, therefore, is the distance between the grooves and their associated bearing side. An eyelet member comprising a retainer spring and a separate washer is provided. The retainer spring has diametrically opposed cylindrical segments interconnected by elongated spring portions and is positioned on the shaft with its cylindrical sections over the grooves. The axial end play of the shaft is adjusted after assembly of the machine to the desired amount and a part of each cylindrical section of the retainer spring is then crimped into engagement with the grooves. The separate washer of the eyelet member in cooperation with the retainer spring limits the axial end play of the shaft, and its location with respect to the crimped part of the retainer spring is determined by the desired end play adjustment.

In the drawing, Fig. 1 is a cross-sectional view of a portion of a dynamoelectric machine end shield and bearing with the shaft being provided with one embodiment of this invention, Fig. 2 is a perspective view of a two-part eyelet member shown in Fig. 1, Fig. 3 is a perspective view of the eyelet member as assembled on a shaft, and Figs. 4 and 5 are plan views illustrating modifications of the eyelet members.

Referring now to Fig. 1, there is shown a portion of the end shield 1 of a dynamoelectric machine having a bearing support 2 with a sleeve bearing 3 mounted therein. A shaft 4 is rotatable seated in the bearing 3 and has extensions 5 and 6 extending beyond the bearing on both sides thereof. The bearing is lubricated by a wick 7 formed of absorbent material positioned in a transverse opening 8 in the bearing support 2 and bearing 3. A cup-shaped member 9 is secured to the end shield 1 and surrounds the bearing forming a lubricant reservoir 10. A shoulder 11 is formed on the shaft extension 6 for limiting axial movement of the shaft in the direction of the shaft extension 5 and a plurality of lubricant throwing grooves are cut or otherwise formed on this shaft extension to throw any lubricant which may pass through the bearing and along the shaft centrifugally against the cup-shaped member 9 and into the lubricant reservoir 10. A standard thickness thrust washer 13 is positioned on the shaft extension 6 abutting the end 14 of the bearing and bearing support and a cup-shaped lubricant throwing washer 15 is positioned between thrust washer 13 and the shaft shoulder 11 and is supported by a standard thickness supporting washer 16. Another standard thickness thrust washer 17 and a second thrust washed 17a are positioned on the shaft extension 5 abutting the end 18 of the bearing and bearing support. It will now be readily seen that the only tolerances in this structure accumulate from the shaft shoulder 11 through the cup washer 15, supporting washer 16, thrust washer 13, the bearing 3, the thrust washer 17a, and the standard thickness washer 17.

In order to provide for simple adjustment of the axial end play of the shaft 4 after its assembly in the bearing and to limit the axial end play to a predetermined amount, the arrangement now to be described and shown in Figs. 1–3 is provided. Diametrically opposite grooves 19 are cut or otherwise formed in the outer periphery of the shaft extension 5 and equally spaced from the end thereof. This provides a variable dimension 20 between the grooves 19 and the thrust washer 17a which is determined by the tolerances recited above. An eyelet member 21 comprising an axially split retainer spring 22 and a separate washer 23, as best seen in Fig. 2, is provided. Retainer spring 22 is formed of two diametrically opposite cylindrical segments 24 and 25 interconnected by two elongated spring portions 26 and 27. Retainer spring 22 is positioned on the shaft extension 5, as shown in Figs. 1 and 3, with its cylindrical segments 24 and 25 extending over the grooves 19, and the separate washer 23 is positioned on the shaft extension 5 between and abutting the thrust washer 17 and the retainer spring 22 in order to limit the axial movement of the shaft 4 in the direction of the shaft extension 6 when the retainer spring 22 is secured to the shaft extension 5. The axial end play of the shaft 4 is adjusted to the desired amount and a part 28 of the cylindrical segments 24 and 25 is then crimped into engagement with the grooves 19 to secure the retainer spring 22 to the shaft extension 5. Preferably the crimp 28 in retainer spring 22 is made in an arcuate form as shown in Figs. 2 and 3. Thus the spacing between the crimped part 28 and the washer 23 is determined only after assembly of the shaft in the bearing to provide a predetermined amount of axial end play. The eyelet 21 has no definite predetermined location with respect to the grooves 19, its location being determined only by the end play requirement. It will be readily apparent that the tolerances involved between the after shoulder 11 and the standard thickness washer 17 are less than those which would be accumulated by holding the shaft between two bearings, and the sum of these tolerances is readily compensated for by variable dimension 20. To close the open end of end shield 1 a cup-shaped cap 29 may be provided as shown in Fig. 1.

In the contruction of dynamoelectric machines of fractional horsepower frame size, it has been found that the best practical limits for end play with the shaft held between two bearings is .005 inch to .020 inch, the latter being excessive end play for centrifugal switch adjustment. By utilizing the improved crimped eyelet of this invention with the shaft held around one bearing, the end play can be easily held from .005 inch to .010 inch. Furthermore, by use of my invention the end play adjustment can be made after the machine is assembled, thus saving the time which was formerly taken to select shim washers of appropriate thickness. In the actual assembly operation, a crimping tool can be used which is located on the end of the shaft extension 5 so that the crimping is always directly into the grooves 19 even though the cylindrical segments 24 and 25 of the retainer spring 22 cover the grooves, the variable dimension 20 being first adjusted to give the proper end play before the crimping is made. The end play limiting arrangement of this invention is superior to a spring or screw end play limiting arrangement since it is adjustable until fixed and once fixed is solidly secure with no chance of looseness as with a screw or pressed fit, and with no constant drag or variation of end play with axial pressure as with a spring arrangement. If desired, the washer 23 may be made cup-shaped to act as a lubricant thrower.

In the application of an eyelet comprising a retainer spring and separate washer in an arrangement as described above, I have found in practice that the shape of the retainer spring is of particular importance. For example, if the retainer spring were made in the form of an axially slotted cylinder or if it were made integral with the washer, the spring then would have a smaller spring section and its elastic limit would be exceeded when the spring is reassembled unless it were made of a hard steel. One objection to making the retainer spring of a hard steel is that it must be sheared over the shaft which is normally made of a soft steel. It would be possible to make the shaft of a hard steel to compensate for the hard steel retainer spring and the combination would then be workable. However, such an expedient would entail a higher cost of shaft manufacture.

Therefore, in accordance with my invention, I provide the elongated spring portions 26 and 27 in the retainer spring 22 thereby increasing the length of spring section of the retainer spring and preventing the elastic limit of the soft steel spring from being exceeded in the event that the retainer spring is reassembled. Thus the necessity for a hard steel shaft is eliminated, and, if the machine is to be disassembled, on reassembly the eyelet retains the same end play adjustment.

Further modifications of my eyelet, employing the basic principle of elongating the spring section thereof, are illustrated in Figs. 4 and 5. As shown in Fig. 4, a modified form 30 of retainer spring is provided with an elongated portion 31 to provide the necessary spring length and a portion 32 diametrically opposed to the portion 31 is made in the form of a clasp to bias the cylindrical segments 33 of the retainer spring against the shaft. Portions 34 of the cylindrical segments 33 are crimped into grooves 19 to secure the retainer spring to the shaft extension 5 as previously described. Another modification of the eyelet is shown in Fig. 5 wherein the spring sections 35 are corrugated in form to provide the necessary spring length.

It will now be readily apparent that this invention provides a quick and simple arrangement for adjusting the end play of a shaft after the assembly of the shaft in the bearing. A further advantage of my invention is the provision of a long spring length in the retainer spring permitting ready disassembly and reassembly of the retainer spring on the same shaft without distorting the spring or requiring the use of a hard steel in the manufacture of the same. While this invention has been described as adapted to adjust the end play of a unit bearing device, it will be readily apparent that it is ideally suited for end play adjustment of a multiple bearing structure.

While I have shown and described particular embodiments of my invention, it will be obvious to those skilled in the art that various changes and modifications may be made without departing from my invention in its broader aspects, and I, therefore, aim in the appended claims to cover all such modifications as fall within the true spirit and scope of my invention.

What I claim as new and desire to secure by Letters Patent of the United States is:

1. In combination, a bearing, a shaft rotatably supported by said bearing and extending on both sides thereof, a shoulder formed on one extension of said shaft for preventing axial movement thereof in the direction of the other shaft extension, said other shaft extension having a groove formed in its outer periphery spaced from the end thereof, and an eyelet member comprising an axially split retainer spring and a separate washer, said retainer spring having oppositely disposed cylindrical sections interconnected by an elongated spring portion, said retainer spring being positioned on said other shaft extension with its cylindrical sections positioned over said groove and engaging said shaft, said elongated spring portion being spaced from said shaft, said separate washer being positioned to abut said retainer spring and said bearing to prevent axial movement of said shaft toward said one shaft extension when said retainer spring is secured to said other shaft extension, a part of the axial edge of said retainer spring being crimped into engagement with said groove to secure said retainer spring to said other shaft extension, said separate washer being spaced from said crimped part by a distance which provides a predetermined amount of axial end play between said washer and said bearing whereby the axial end play of said shaft can be adjusted to a predetermined amount by the location of said crimped part with respect to said washer.

2. In combination, a bearing, a shaft rotatably supported by said bearing and extending on both sides thereof, a shoulder formed on one extension of said shaft for preventing axial movement thereof in the direction of the other shaft extension, said other shaft extension having oppositely disposed grooves formed in its outer periphery equally spaced from the end thereof, and an eyelet member comprising an axially split retainer spring and a separate washer, said retainer spring having oppositely disposed cylindrical sections interconnected by elongated spring portions, said retainer spring being positioned on said other shaft extension with its cylindrical sections positioned over said grooves and engaging said shaft, said elongated spring portion being spaced from said shaft, said separate washer being positioned to abut said retainer spring and said bearing to prevent axial movement of said shaft toward said one shaft extension when said retainer spring is secured to said other shaft extension, parts of each axial edge of said retainer spring being crimped into engagement with said grooves to secure said retainer spring to said other shaft extension, said separate washer being spaced from said crimped parts by a distance which provides a predetermined amount of axial end play between said washer and said bearing whereby the axial end play of said shaft can be adjusted to a predetermined amount by the location of said crimped parts with respect to said washer.

3. In combination, a bearing, a shaft rotatably supported by said bearing and extending on both sides thereof, a shoulder formed on one extension of said shaft for preventing axial movement thereof in the direction of the other shaft extension, said other shaft extension having oppositely disposed grooves formed in its outer periphery spaced from the end thereof, and an eyelet member comprising an axially split retainer spring and a separate washer, said retainer spring having oppositely disposed cylindrical sections interconnected by an elongated spring portion, and a spring clip portion, said retainer spring being positioned on said other shaft extension with its cylindrical sections positioned over said grooves and engaging said shaft, said elongated spring portion being spaced from said shaft, said separate washer being positioned to abut said retainer spring and said bearing to prevent axial movement of said shaft toward said one shaft extension when said retainer spring is secured to said other shaft extension, parts of each axial edge of said retainer spring being crimped into engagement with said grooves to secure said retainer spring to said other shaft extension, said separate washer being spaced from said crimped parts by a distance which provides a predetermined amount of axial end play between said washer and said bearing whereby the axial end play of said shaft can be adjusted to a predetermined amount by the location of said crimped parts with respect to said washer.

LAWRANCE W. WIGHTMAN.

REFERENCES CITED

The following references are of record in the file of this patent:

UNITED STATES PATENTS

| Number | Name | Date |
| --- | --- | --- |
| 2,471,180 | Wightman | May 24, 1949 |